United States Patent [19]

Deborski

[11] 4,179,350

[45] Dec. 18, 1979

[54] CATALYTICALLY INNATE ELECTRODE(S)

[75] Inventor: Gary A. Deborski, Midland, Mich.

[73] Assignee: The Dow Chemical Company, Midland, Mich.

[21] Appl. No.: 939,561

[22] Filed: Sep. 5, 1978

[51] Int. Cl.² .................. C25B 11/06; C25C 7/02; C25D 17/10; H01B 1/02
[52] U.S. Cl. .................. 204/284; 204/286; 204/292; 252/512; 252/513
[58] Field of Search .................. 204/284, 286, 292; 75/245; 252/512, 513

[56] References Cited

U.S. PATENT DOCUMENTS 3,772,201 11/1973 Mills .................. 204/284

OTHER PUBLICATIONS

Chem Abs, 78:131203b.
Chem Abs, 80:90174p.
Jour. of the Electrochem Soc., 112 (1965), p. 526.
Jour. of Catalysis, 29 (1973), pp. 8–14.

*Primary Examiner*—Howard S. Williams
*Attorney, Agent, or Firm*—R. W. Selby

[57] ABSTRACT

An innate catalytically-active electrode, especially well suited for the electroreduction of oxygen in alkaline media, is comprised at least partially of a substantial proportion of a metal phthalocyanine in dry powder form compounded in intimate mixture with a finely comminutated, particulate metal all fabricated together in an integral porous body form of structure.

14 Claims, 3 Drawing Figures

Cathode Voltage vs. Ag/AgCl (taken on a set of three 10 wt. % Pt compacts, with open figures denoting oxygen and solid figures denoting nitrogen)

Cathode Voltage vs. Ag/AgCl (taken on a set of two 10 wt. % Ag compacts, with open figures denoting oxygen and closed figures denoting nitrogen)

CATALYTICALLY INNATE ELECTRODE(S)

BACKGROUND OF THE INVENTION

Gas electrodes, in and with which a gas is passed in contact with a suitable electrode conductor in the presence of an electrolyte solution, are well known. Many modern gas electrodes are made to be porous and to have catalytically-active surface areas, including the walls of the interstitial passageways within the electrode body. In this way, there can be realized maximization of the available and effective surface area for given unit geometric volumes of the electrode configuration.

Such general type and style of electrode construction is especially advantageous for the oxygen gas-bearing, depolarized electrodes, particularly cathodes, that are well adapted for the electroreduction of oxygen in alkaline media.

The usage technique applied with such electrodes often involves passage of the oxygen-bearing gas through the porous electrode body for contact with the involved electrolyte interstitially therewithin and/or at and on the electrolyte-contacting face or wall of the electrode body. The indicated practice is desirable for electrolyzing functions and, conversely, as well as for operation in the galvanic mode as in fuel cells. Oxygen gas-bearing depolarized cathodes so made and operated are particularly attractive for utilization in chlor-alkali and the like or equivalent manufacturing cell operations.

A great and impelling reason (although other benefits also accrue) for employing oxygen gas-bearing, depolarized porous electrodes to electrolyze common salt brine into chlorine and caustic, and for analogous production purposes, is economic. Potentially significant savings in power requirements for a given electrolysis workings are anticipatable due to substantial reductions potentially achievable in needs for applied electrical consumption when such electrodes are utilized. This is evident in comparison of voltage levels for the involved electrochemical reactions, taking into account that conventional cells already are usually operated at quite low voltages; the cathodic reactions (disregarding overvoltage effects) respectively being:

In traditionally common chlor-alkali cells:

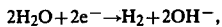

with $E° = -0.828$ volt; and with the oxygen-gas depolarized cathodes:

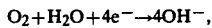

with $E° =$ only 0.401 volt; there being a consequent theoretically attainable saving of 1.229 volts in the difference.

Literally from their inception and classically, oxygen electrodes have been catalyzed by various precious and semi-precious metals and compounds thereof, such as gold, osmium, palladium, platinum, silver and so forth and their alloys, oxides and other compositions. These noble metals are not only in generally scarce supply for other than jewelry adornments and ornamentations and/or monetary purposes, but are inherently extremely expensive for industrial applications. Because of this, their consumption for electrode preparation is carefully controlled and extended to the greatest possible extent; this usually being done so as to minimize total quantity usage by deposition thereof in the form of platings or other applied layers or coatings over a suitable substrate, such as porous nickel plaque.

It would obviously be desirable to have for convenient usage an efficacious and more adaptable and readily-available, less costly, highly effective and catalytically-active porous electrode, especially for satisfactory use in alkaline media as oxygen gas-bearing depolarized cathodes for electrolysis or even for galvanic mode purposes.

The metal phthalocyanine materials (including mixtures thereof) are known to be excellent and highly active electrocatalysts, as is brought forth in various literature references, including *Chemical Abstracts* 78:131203b and 80:9017p; *Journal of The Electrochemical Society,* 112, 526 (1965); *Journal of Catalysis,* 29, 8–14 (1973); *Journal of Applied Electrochemistry,* 3, 213 (1973); and *Electrochim. Acta,* 19, 83 (1974). The contemplated metal phthalocyanine compounds or complexes, incidentally, are usually those of the structure:

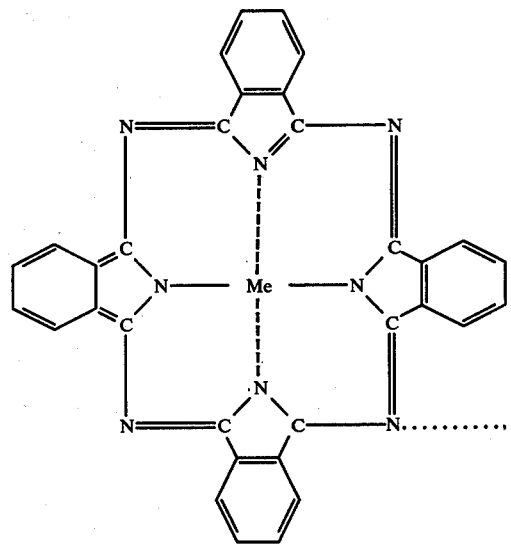

the Me unit being a metal ion such as cadmium, cobalt, copper, gallium, iridium, iron, magnesium, manganese, nickel, silver and zinc (i.e., symbolically and respectively, Cd, Co, Cu, Ga, Ir, Fe, Mg, Mn, Ni, Ag and Zn) and so forth amongst the many other like or equivalent organometallic phthalocyanine compounds and complexes known in the art. The copper form is, of course, the well known and widely-utilized "Phthalocyanine Blue" dyestuff.

The heretofore known means for utilizing some form of the metal phthalocyanines generally employ these compounds of the metal as coatings for the electrode.

FIELD AND OBJECTIVES OF THE INVENTION

The present invention lies generally in the field of electrochemistry, being more particularly relevant to an improved, catalytically-active, porous electrode construction that is very nicely adaptable to the electroreduction of oxygen in alkaline media, which electrode is made substantially if not completely of relatively plentiful and modest in cost electrocatalytic materials integrated in a structure with finely comminutated, particulate, metals or powders and which electrode is neither expensive nor complicated to fabricate and gives good and reliable results in operation; the furnishment of same for various electrochemical applications being among the principal aims and objectives of the invention.

SUMMARY OF THE INVENTION

The present invention is directed to an electrode body for the herein delineated electrochemical purposes that, in basic substance and essence, is formed of: a shaped mass of compacted, integrated powder comprised of an intimate, substantially uniform admixture of: a preponderant proportion of said mass of finely communitated, particulate, metal powder; and a minor proportion of an electrocatalytic metal phthalocyanine powder; said mass being cohesively bonded together by either loose or, if desired, pressurized consolidation of the individual metal and phthalocyanine powders and particles therein by either suitable low temperature sintering procedures and/or other means for bonding and/or associated or sole physical densification so as to result in an apparent density that is less than the theoretically attainable density of the involved metal in the mass and thereby to leave internal pores and interstitial passageway voids in said body.

In many cases, compacting and/or low temperature sintering procedures may advantageously be followed in order to achieve in the shaped mass that is formed either a pressurized consolidation thereof alone or with added sintering effects and results therein.

The working proportional details and other significant and more exact specifics of the invention are also ingenuously set forth in the ensuing Specification and description.

PARTICULARIZED DESCRIPTION OF THE INVENTION

Figure 1:
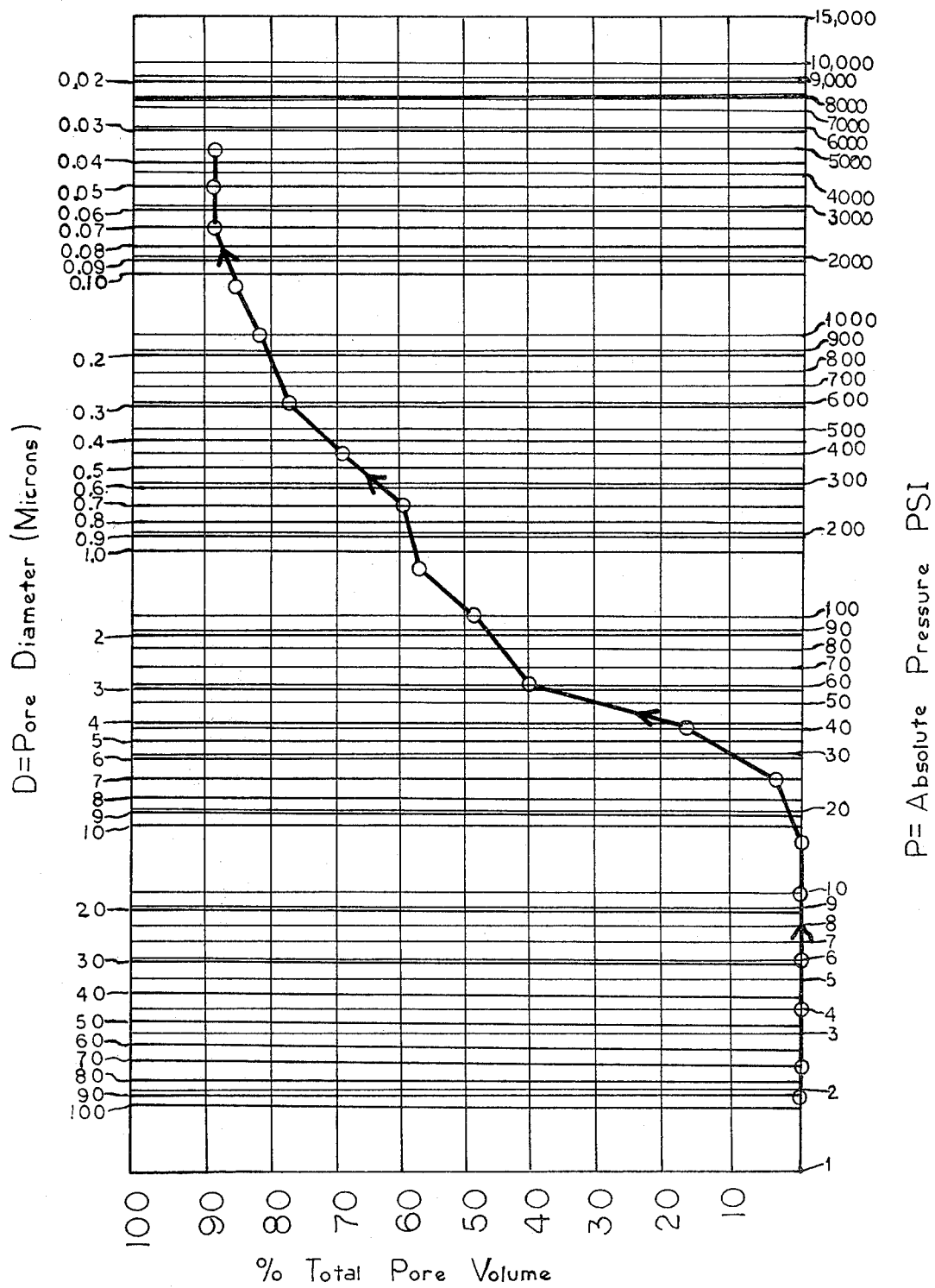
FIG. 1 shows the pore sizes of an electrode prepared in accordance with the present invention.

Porous electrodes or, more definitively, electrode bodies pursuant to the instant invention are comprised at least partially of a suitable mixture of a mixture of a metal phthalocyanine electrocatalytic material and a preponderance of a metal powder coherently fabricated to desired integral geometric composite mass configuration or shape. The resultant electrode, consequently and advantageously, is wholly and completely electrochemically catalytic when operated, this in many cases being especially beneficial during employment of many of the electrode possibilities hereunder in alkaline media as an oxygen depolarized electrode.

In this connection, the "body" of the electrode, for present purposes, is descriptively considered to be the essential, electrochemically-functioning, porous part of the entire electrode assembly devoid of electrical connections for activation and physical structure means for mounting and support in a cell or the like.

As indicated, the integrated electrode body is generally composed in substantially great preponderance of a pressure consolidatable metal powder in the composite with the metal phthalocyanine powder. Advantageously, such a mixture may be one of the catalyst with nickel (particularly carbonyl nickel) powders, although other metal powder components may be utilized such as copper, cobalt, iron, various of the stainless or corrosion-resisting steel alloys, manganese, the several nickel alloys and mixtures thereof or, additionally, with more than a single metal powder in the admixture so as to actually have a two- or more phase powdered metal mixture with the catalyst interdispersion in the manufactured electrode.

In any event, the integrated, shaped porous electrode body should be made from a preponderance of a finely divided particulate or powder metal with the admixed composition containing at least about 1 weight percent, based on gross weight of the composition, of the metal phthalocyanine catalyst. It is desirable for the compactable composition to contain between about 2 and 20 weight percent of the catalyst constituent, with greater fragility in the structures (especially when minimal compacting pressures are utilized) often being experienced with increasing phthalocyanine powder content. Nonetheless, about a 1:9 weight ratio of catalyst/metal is frequently found to be a very good and versatile mixture to utilize for many purposes.

Of the above-mentioned metal phthalocyanines to use as the integrated component in fabrication of the catalytically innate porous electrode bodies of the present invention, those of manganese, iron (in both ferrous and ferric bi- and tri-valent forms), cobalt, nickel and zinc are frequently advantageous to employ because of their good electrocatalytic capability and satisfactory ability to resist decomposition for many use purposes. Cobalt and manganese forms of the catalyst are particularly good and relatively inexpensive materials; with cobalt phthalocyanine being well adapted to withstand chemical attack in aqueous alkaline media.

The metal powders from which are made the porous electrode bodies of the present invention should be as fine and uniformly sized as possible. Average particle sizes as small as 0.2 microns or those approaching such miniscule dimensions are desirable. Nickel, for example, is frequently easily available in powdered form of very small average particle size on the 2-5 micron scale. Generally, the average metal particle size in the powder utilized is not in excess of 50 or so microns, being better if not larger than that on the 20-30 micron range.

The particular shape or discrete particle configuration of the nickel or other metal powders employed is of no special criticality, as is in most cases their source or method of preparation. It is merely necessary for the metal powder(s) to have appropriate characteristics so as to be fabricatable and compactable according to established, low temperature-requiring powdered metal technology. Sometimes, however, when they are available in such physical form it may be beneficial for the individual powders to have pronouncedly crenulated or saw-tooth outlines since with such a style they may tend to interlock better and more securely upon compaction under pressure (thus allowing avoidance of any severe heat treatments to achieve satisfactory cohesiveness of and structural integrity in bodies fabricated therefrom).

The purity of the metal powder employed should be as high as possible. Its content of oxide inclusions, dirt and other dross impurities should be at the lowest level procurable at least on a practical basis for commercial purposes, so that its constituency is as close to the elemental metal as is reasonably possible to obtain. Usually, commercial grades of many of the available metal powders are suitable; although it may oftentimes be advantageous and worthwhile to utilize reagent grade materials for making the porous electrodes pursuant to the invention. A generally satisfactory grade of carbonyl nickel powder for mixture with particulated manganese in practice of the invention is that commercially available and known as "Mond Type 287".

As indicated, the electrode bodies are oftentimes advantageously prepared by compaction of the involved mixture of the metal phthalocyanine with metal powder(s) in the so-called "green" form according to established powdered metal procedures. This may additionally include, as desired or necessary for any given fabrication, cold pressing and/or relatively low temperature hot pressing with or without subsequent modest heat treatment. As regards the avoidance of excessive heat exposure during the fabrication of the mixed catalyst/metal powders for preparation of electrode bodies in practice of the present invention, proper account must be taken of the fact that most metal phthalocyanines complexes tend to thermally decompose or degrade upon exposure to heat at relatively elevated temperatures. A large number of the phthalocyanines possible to employ are quite stable, as organometallic materials go, to increased temperature conditions even as rigorous as 400° C. or more in vacuum. Nevertheless and as is readily apparent, temperature conditions higher than those tending to cause thermal decomposition should not be utilized in the fabrications. This frequently eliminates for the purpose many of the classically-typical, elevated temperature powder metal sintering operations since they normally require operating temperatures to be employed on the 800°–1000° level.

However, it is possible to prepare a satisfactory shaped mass body (especially if maximum porosity is desirable therein) by mere sintering or exposure to heat at a suitable, and even relatively low, temperature level of a confined but more or less loose mass of appropriate low temperature bounding, mixed green metal and catalyst powders so as to bond the mass together solely under and by virtue of thermal influences and cohering causations without added dependence on physical, pressured compaction for consolidation and densification. In this connection, an excellent fundamental comprehension of shaped mass fabrication of metal and the like powder bodies according to powder metallurgy techniques is available at pgs 155–171 and 216–231 of "*Introduction to Powder Metallurgy*" by Joel S. Hirschhorn (published by the American Powder Metallurgy Institute, 201 East 42nd Street, N.Y. 10017, 1969 Ed.), and in like reference sources.

Another way that is sometimes suitable for making the cohesively bonded porous bodies is to utilize adhesive bonding agents to assist in obtaining of the desired coherent shaped mass of metal and phthalocyanine powders being fabricated. Such bonding agents may be utilized with or without the application of a compacting, densification-increasing pressure; the use and/or extent of this likewise depending on the degree of porosity wanted from the starting mixed green powders in the electrode body being made. The bonding agent employed should be used in conventional quantities for the purpose; care being taken to not employ so much as might interfere with either satisfactory final open pore availability in and/or necessary electroconductivity of the resultant electrode body. Typical of bonding agents adaptable to such mode of electrode body fabrication are: various "Teflon" latexes and other fluorinated hydrocarbon polymers; epoxy cements; acrylate compositions and so forth.

Of course, the particular shape and configuration of the electrode body being made, as well as its intended porosity arrangement, must be given proper consideration in selection of the particular modes of fabrication to follow, as is all readily comprehended by those skilled in the art. The morphology and particle size distribution plus the actual compositional mixture of the metal and phthalocyanine catalyst powders being fabricated must be taken into account when other than loose, low temperature sintering practices are followed to obtain maximum porosity products. More or less normal compacting pressures for the preparation of less than fully consolidated masses are usually employed for the purpose. These in typical but not limiting illustration of this, may be on the order of 40–60 thousand psi or so.

A particularly attractive way to achieve and better control desired porosity characteristics and extents in the electrode bodies being fabricated is to include and utilize in the powdered metal mass being compacted a (generally minor) proportion of an inert, fugitive filler and pore-forming assistant that is removable after the pressing upon application of relatively low temperature heat causing thermal decomposition or sublimation of the transient filler material or pore former (or even by other extraction means, such as leaching) so as to leave purposive voids or pores in the resultant structure. Fugitive fillers decomposable by heat at not greatly elevated temperatures are ordinarily desirable since, if not specially decomposed for riddance in a separate heating step for the purpose, removal thereof may alternatively be neatly accomplished coincident with any heat treatment done with the compacted body. In this connection, any heating at not excessively elevated temperatures of the formed body may be preferable to perform in an inert atmosphere, such as nitrogen, argon and so forth.

In this connection, it is sometimes found that more uniform porosity effects are achieved by utilizing green metal and catalyst powder mixtures of a uniformly small particle size that are fabricated without compaction by loose sintering techniques at relatively low, non-catalyst-destroying temperatures or, when physically pressure densified, by minimizing the degree of compaction that is performed on the mass being formed.

One of the advantages in using as a pore former a fugitive filler component is to allow application of greater compacting pressure on the powdered metal mass in its fabrication without risk of excessive consolidation of the resultant electrode form. This avoids rendering of the desired porous body into too much of a densely solid structure. On the other hand, use of too much fugitive pore former in the electrode fabrication may also result in excessively fragile and delicate porous body products; so care should also be taken to avoid undesirable consequences in this regard.

Ammonium carbonate, $(NH_4)_2CO_3$, is a particularly good material to employ as a fugitive filler for the powdered metal masses being formed into electrode bodies. It is suitably and compatibly pulverulant, and also readily disappears under sufficient heat into harmless products of decomposition at a relatively low temperature of about 58° C.; being further not reactive with the metals appropriate for use in following of the invention. Many like and equivalent substances may also be utilized as pore forming additives, as will be recognized by those skilled in the art. Usually depending on what particular effect is trying to be accomplished and the particular properties involved of the substance employed for the purpose, the quantity of fugitive filler to incorporate in the catalyst-containing metal powder mass to be compacted may be as high on a volume basis as the maximum percentage of porosity intended to be achieved in the final body structure. Of course, lesser proportions are also possible to employ. Oftentimes when ammonium carbonate is utilized, a charge thereof of between about 5 and 15 weight percent, frequently 10 or so percent, based on weight of the mixed catalyst/metal powders in the mass, is suitable for the admixture.

It is sometimes desirable to provide a foraminous screen or mesh reinforcement or backing internally or on one side of the electrode body. This may be done if the body, per se, tends to be somewhat weak and/or brittle in nature. While many materials can be used for this, expanded nickel sheet or the like is generally quite suitable for such purpose, as are woven nickel or stainless steel screens. Along this line, it is sometimes quite effective and simply-enough done to actually contain the entire electrode body in an enclosing basket- or cage-like enveloping foraminous sheet or screen protective package. This allows for adequate accessibility of liquid and/or gaseous fluids to a possibly fragile and not high-strength electrode body while offering satisfactory protection thereto against disintegration, crumbling or other physical failure of the electrode in use.

Electrode bodies in accordance with the present invention are advantageously prepared to have a porosity value (reckoned as a percentage of void space in a given volume or porous body or the difference remaining from 100 percent upon subtraction of the percentage of theoretical density measurable in the given solid-geometric body volume) that is between about 30 and about 90 percent. Advantageously for many utilizations, this value is found to be from about 60 to about 85 percent. The porosity, of course, provides for the desired minutely apertured interstitial passageways formed within and traversing the electrode body. As has been indicated, porosity is capable of being controlled by apt use of the pressure applied for compaction of the powdered catalyst/metal mass and/or utilization of fugitive filler material in the unconsolidated mixture.

As is apparent from introspection and by way of some re-stressing reiteration, excessive porosity in compacted body structures from given powdered starting compositions may result in a too fragile and delicate an obtained structure. On the other hand, too much consolidating densification may result in a body structure having overdiminished pore characteristics with interstitial passageways too small and fluid-inaccessible for most effective electrode usage (resulting in an electrode having undesirably low interior surface area per unit volume of body thereof). The larger pore sizes suitable for electrode purposes, such as those having, say, an average diameter or equivalent passageway opening measure on the order of 10–15 microns, are obtained by fabricating the electrode with minimized compaction using only a "loosely" pressed catalyst metal powder mass for the purpose. In other words, only enough pressure is in such cases applied to the mass to give an adequate conglomerating effect in order to provide an integral, unitary and cohesive, powdered metal product.

In this connection, the appropriate average pore size to effect and have in the porous electrode bodies of the present invention depends, as will be appreciated by those skilled in the art, upon the particular use application to be made thereof. Usually, porous electrode bodies having nominal pore size diameters in the range of from about 0.1 to about 12 or so microns are adaptable to a wide variety of electrode utilizations. Often, it is more advantageous to have this range in the numerical size limitation that is between about 1 and 11 microns, with it sometimes being preferable to have it fall in an approximate 3–8 micron nominal diameter (or equivalent measure) span.

It is also usually beneficial for the degree of porosity built into the electrode body to be so correlated such that the total hole or open area on any given section of exposed surface or face portion of the structure provides an adequate proportion of the total area of that exposed surface so as to ensure satisfactory mass transfer capabilities and effects for fluid ingress and egress with respect to the electrode body.

Literally any desired configuration and/or planar curvilinear body shape can be given to the porous electrocatalytically innate, metal phthalocyanine-containing electrodes of the present invention. Wall section size or planar geometric face area can be as desired; and thickness can be suitable for given intended usages. It is frequently the practice to make the electrode body in a generally thin and flat rectangular or circular plaque form; although various composite structures (such as dual porosity arrangements) and other built-up forms may also be provided. Body thicknesses in such constructions may ordinarily be varied in the overall between about 5 and 500 or more mils (ca. 1.25 millimeters and 1.3 or so centimeters). More often it is in the range, frequently occurring as a matter of choice or design, between about 10 and about 250 mils (ca. between about 2.5 millimeters and 0.6 centimeters). In many cases, an appropriate body thickness for many electrochemical applications is found to be between about 15 and about 100 mils (ca. 3.75 and 125 millimeters).

Along this line, excellent dual porosity electrode bodies may be readily prepared in the practice of the present invention. This, by way of illustration, may be done by first preparing a coarse pore layer (such as one of a catalyst/manganese (optional)/nickel powder mixture) with loose sintering or minimzed compaction fabrication followed by fabrication thereon and thereover of the fine pore layer (such as one of a small particle size catalyst/nickel powder mixture) which is made and sintered in situ upon the coarse pore base with greater compacting effort for densification of the added fine pore layer.

EXEMPLIFICATION AND ILLUSTRATION OF THE INVENTION

To demonstrate the advantageous practice of the present invention, a number of experiments were performed with various porous metal phthalocyanine-containing electrode bodies. These were tested for performance and comparison with electrodes containing other outstandingly good catalytically active metals, all as is set forth in the following; the same being taken in conjunction with the several views of the accompanying Drawing which are all graphical representations wherein FIGS. 1, 2 and 3 respectively depict additional data obtained from running the experimentations.

EXAMPLE

A number of individual physical mixtures were made containing on a parts by weight in total composition bases: 80 parts of carbonyl nickel powder (Mond Type 287); 10 parts of the particular metal phthalocyanine being tested; and 10 parts of ammonium carbonate powder (MALLINKRODT Analytical Reagent, ball milled and screened to less than 37 microns). This was done for each mixture by charging the components to a mortar wherein they were thoroughly blended. A one gram portion of each mixture was placed in a ½ inch (ca. 1.27 cm) diameter, single action pellet press and compacted under 10,000 pounds (ca. 4536 kg) pressure (ca. 51,000 psi or 703 kg/cm$^2$). Each disc formed was heated to 110° C. in a drying oven for 30 minutes to rid it of the ammonium carbonate ingredient and then cooled.

Individual discs were so prepared using in the mixture: manganese phthalocyanine (i.e., "Mn (II) Pc"); ferrous phthalocyanine (i.e., "Fe (II) Pc"); ferric phthalocyanine (i.e., "Fe (III) Pc"); cobalt phthalocyanine (i.e., "Co (II) Pc"); nickel phthalocyanine (i.e., "Ni (II) Pc"); and zinc phthalocyanine (i.e., "Zn (II) Pc").

A porosity determination was made on a 0.1753 g quantity of the Mn (II) Pc disc which contained 11 weight percent thereof in the nickel and had a true density of 6.61 g/cc and a total porosity value of 48.08 percent by volume. The results, as graphically shown in FIG. 1 of the Drawing, demonstrated that there were a high percentage of pores on the order of 4 microns and smaller in the sample.

Each of the discs was then mounted in a ⅜ inch (ca. 0.951 centimeter) stainless steel "Swagelock" type tube fitting with an epoxy cement adhesive so that the area available for contact with the solution was a circle ⅜ inch (ca. 0.9225 cm) in diameter (providing a face of 0.11 square inch or ca. 0.71 square centimeter). This tube fitting was attached to gas delivery tubes and connected as the cathode in an electrolytic cell. The electrolyte was an aqueous solution containing 100 g/liter NaOH at 60° C.; the anode was a thin platinum screen; and the voltage of the cathode was measured versus a standard Ag/AgCl reference electrode as was commercially obtained from BECKMAN INSTRUMENTS under the trademark "Lazaran". Voltage of the cathode versus Ag/AgCl was individually recorded at cell current densities of 0.50 amp/sq. in. (ca. 0.775 amp/cm$^2$.) with separate supplies to the electrode of oxygen, air and nitrogen each in turn supplied at about 10.0 psig. The drop in cell voltage when supplied with oxygen or air compared to the values when supplied with nitrogen is taken as a measure of the effectiveness of the catalytic activity of the electrode when subjected to such testing.

Figure 2:
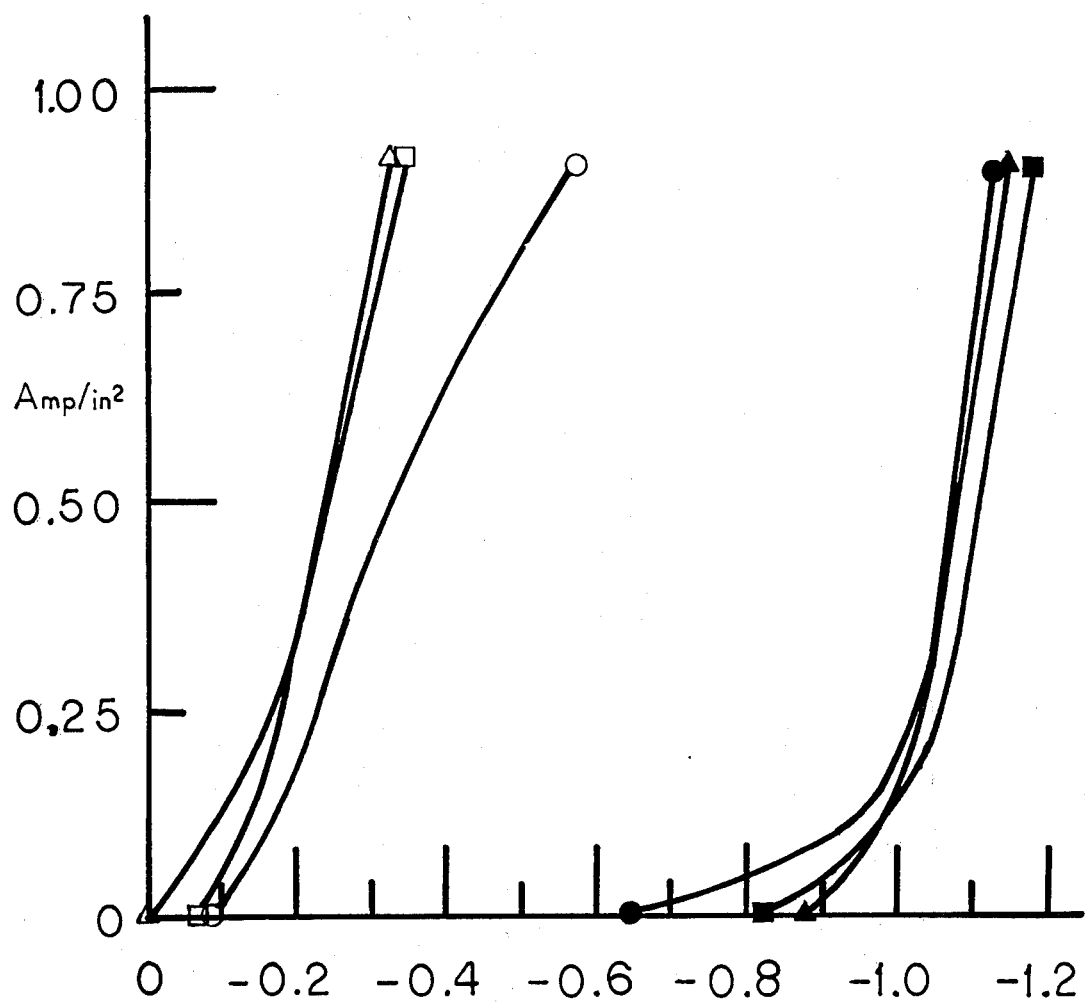
FIGS. 2 and 3 show voltage vs. current curves for various electrodes prepared in accordance with the present invention.
Figure 3:
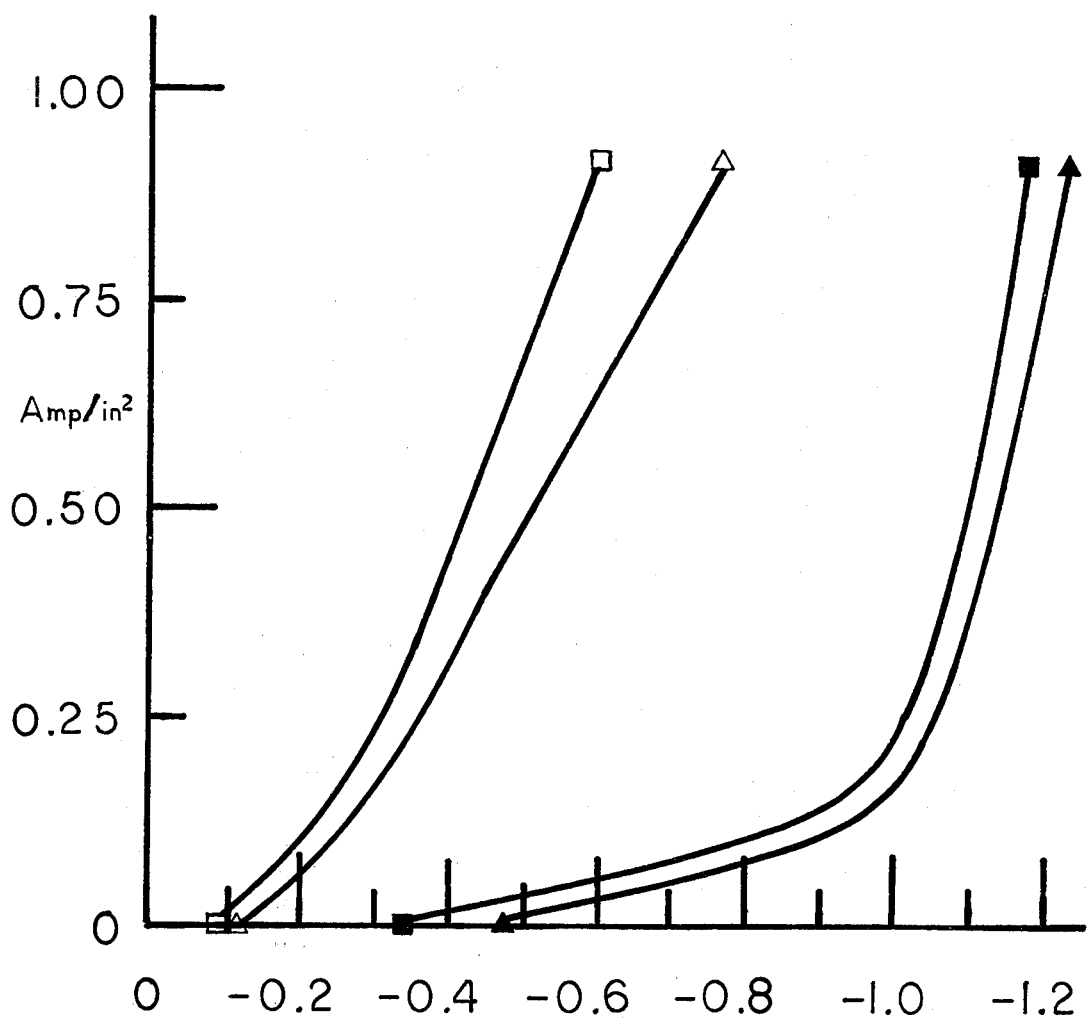

In order to have some basis for comparison, several sets of electrodes were prepared in the manner described above with known, excellently performing oxygen reduction catalysts i.e., silver and platinum. The tests of these electrodes also serve to illustrate the reproducibility of this method of preparation. FIG. 2 shows the voltage vs. current curves for electrodes containing 10 weight percent Pt both on oxygen and on nitrogen. FIG. 3 shows the same type curves for 10 weight percent Ag.

The voltage reductions ("depolarization") at 0.5 amp/in$^2$ are tabulated below for these electrodes as well as for a set containing 1 weight percent Pt and a set prepared in a similar manner from pure silver powder (with none of these values not taking into account the fact that the hydrogen overvoltage on these materials is approximately 0.2 volts less than on steel punch plate, a conventional and frequently-employed cathode material).

TABLE I

"Depolarizations" (volts) of Proven Oxygen Catalysts
At 0.5 amp/in$^2$, 60° C., and 100 g/l NaOH

| Test Electrode | A | B | C |
|---|---|---|---|
| 100 wt. % Pt | 0.76 | 0.86 | 0.84 |
| 10 wt. % Ag | 0.68 | — | 0.62 |
| 1 wt. % Pt | 0.75 | 0.75 | 0.77 |
| 100 % Ag | 0.78 | 0.73 | 0.80 |

For purposes of comparison of the extraordinarily attractive results obtained by practice of the present invention, the average depolarization values of the pressed powder samples containing 10 weight percent of the phthalocyanine complexes of Mn(II), Fe(II), Fe(III), Co(II), Ni(II) and Zn(II) are set forth in the following TABLE II for each metal complex on both oxygen and air. Note that the Mn(II) and Co(II) complexes actually out-performed the above-mentioned silver catalyzed compacts.

TABLE II

"Depolarizations" (volts) Of Several Metal Pc Catalysts
At 0.5 amp/in$^2$, 60° C. and 100 g/l NaOH

| | Oxygen | Air |
|---|---|---|
| Mn(II)Pc | 0.73 | 0.57 |
| Fe(II)Pc | 0.44 | 0.00 |
| Fe(II)Pc | 0.59 | 0.48 |
| Co(II)Pc | 0.77 | 0.62 |
| Ni(II)Pc | 0.68 | 0.36 |
| Zn(II)Pc | 0.55 | 0.22 |

The results of each of the testing showed an excellent and very encouraging depolarization voltage of the electrochemical cell with the electrodes prepared according to the invention.

Similar good results are obtainable with an electrode test disc if made in the same way as those employed in the foregoing from a 1:9 weight ratio mixture of the powdered phthalocyanine and a metal powder base of equal parts by weight of particulated nickel and manganese.

Analogous and commensurate excellent and surprisingly good results are obtainable with the same and similar porous manganese made from other powder metal bases admixed with the same and other metal phthalocyanine catalyst powders electrodes when employed in other electroreduction systems and for other electrochemical purposes (including synthesis reactions and so forth) or when utilized in the galvanic mode, as in fuel cells with an aqueous sodium hydroxide catholyte therein.

Many changes and modifications can readily be made and adapted in embodiments in accordance with the present invention without substantially departing from its apparent and intended spirit and scope, all in pursuance and accordance with same as it is set forth and defined in the hereto appended claims.

What is claimed is:

1. An integral, catalytically-active porous electrode body formed of:
   a shaped mass of compacted, integrated powder comprised of an intimate, substantially uniform admixture of:
   a preponderant proportion of said mass of finely communitated, particulate, metal powder; and
   a minor proportion of an electrocatalytic metal phthalocyanine powder;

said mass being cohesively bonded together by consolidation of the individual metal phthalocyanine powder and metal particles therein so as to leave internal pores and interstitial passageway voids in said body.

2. The electrode body of claim 1, wherein the powder mixture in said shaped mass contains at least about 1 weight percent, based on the weight of the mass, of said metal phthalocyanine powder.

3. The electrode body of claim 2 made with between about 2 and 20 weight percent of said metal phthalocyanine powder.

4. The electrode body of claim 2, wherein the compacted powder in said shaped mass comprises a mixture of said metal phthalocyanine and nickel powder.

5. An electrode body according to that of claim 4, wherein said powder mixture of metal phthalocyanine powder and nickel powder contains at about 10 weight percent, based on total mixture weight, of said phthalocyanine.

6. An electrode body according to that of claim 2, wherein said metal phthalocyanine is one or a mixture of those selected from the group consisting of the phthalocyanines of cadmium, cobalt, copper, gallium, iridium, iron, magnesium, manganese, nickel, silver and zinc.

7. The electrode body of claim 1, wherein the metal phthalocyanine powder in said shaped mass is cobalt phthalocyanine.

8. An electrode body according to that of claim 1, wherein the porosity thereof is between about 30 and about 90 percent of void space in the total solid geometrical volume of the body.

9. An electrode body according to that of claim 1, wherein the porosity thereof is between about 65 and about 85 percent of void space in the total solid geometrical volume of the body.

10. An electrode body according to that of claim 9, wherein the porosity thereof is such that the interstitial passageways therein have an average nominal pore size diameter or equivalent measure that is between about 0.1 and about 12 microns.

11. An electrode body in accordance with that of claim 1, and including, in combination therewith and in addition thereto;
means for structurally physically reinforcing said compacted mass of admixed particulate metal and metal phthalocyanine powders.

12. An electrode body in accordance with that of claim 11, wherein
said reinforcing means is a supporting foraminous sheet securing said body.

13. An electrode body in accordance with that of claim 11, wherein
said reinforcing means is an enveloping foraminous screen cage-like enclosure for and about said body.

14. The electrode body of claim 1, wherein said mass is cohesively bonded together by pressurized consolidation under physical densification to an apparent density that is less than the theoretically attainable density of the involved metal in the mass.

* * * * *

UNITED STATES PATENT AND TRADEMARK OFFICE
CERTIFICATE OF CORRECTION

PATENT NO. : 4,179,350
DATED : December 18, 1979
INVENTOR(S) : Gary A. Deborski

It is certified that error appears in the above-identified patent and that said Letters Patent are hereby corrected as shown below:

Col. 7, line 31, delete "or" and insert therefor --of--.

Col. 8, line 43, delete "minimzed" and insert therefor --minimized--.

Col. 9, line 43, delete "0.775" and insert therefor --0.0775--.

Col. 10, Table I, 1st item of Col. 1, delete "100" and insert therefor --10--.

Col. 10, Table II, 3rd item of Col. 1, delete "FE(II)Pc" and insert therefor --Fe(III)Pc--.

Col. 10, Table II, 5th item of Col. 2, delete "0.68" and insert therefor --0.63--.

Signed and Sealed this

Tenth Day of June 1980

[SEAL]

Attest:

SIDNEY A. DIAMOND

Attesting Officer     Commissioner of Patents and Trademar